N. A. BOYNTON.

SELF-CLOSING DOORS FOR STOVES.

No. 6,864. Reissued Jan. 18, 1876.

WITNESSES
Franck L. Durand
Philip McNickle

By.

INVENTOR
N. A. Boynton
per L. Deane
Attorney

N. PETERS, PHOTO-LITHOGRAPHER, WASHINGTON, D. C.

UNITED STATES PATENT OFFICE.

NATHANIEL A. BOYNTON, OF NEW YORK, N. Y.

IMPROVEMENT IN SELF-CLOSING DOORS FOR STOVES.

Specification forming part of Letters Patent No. 165,297, dated July 6, 1875; reissue No. 6,864, dated January 18, 1876; application filed November 15, 1875.

*To all whom it may concern:*

Be it known that I, NATHANIEL A. BOYNTON, of New York, in the county of New York and State of New York, have invented certain new and useful Improvements in Self-Closing Doors for Stoves; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
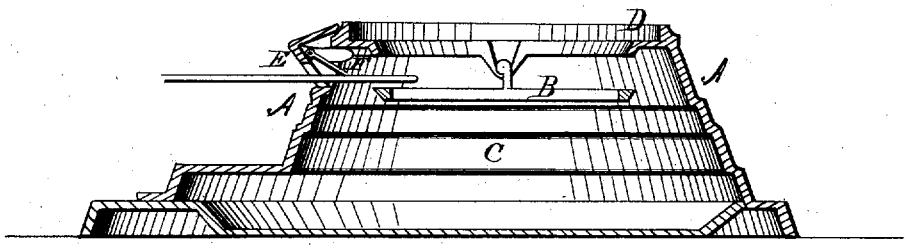
Figure 2:
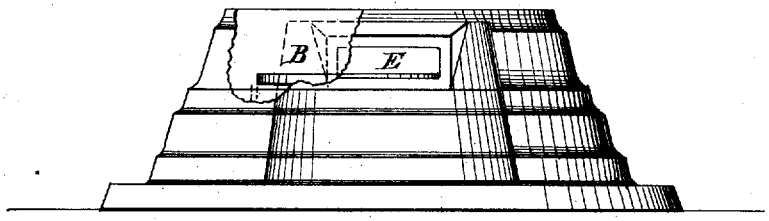
Figure 3:
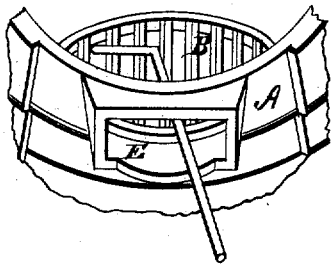

Figure 1 is a vertical section from front to rear. Fig. 2 is a front elevation with a portion of the stove-wall broken away. Fig. 3 is a detail in perspective.

The object of this invention is to provide a self-closing door for the opening in the body, base, or other part of a stove or furnace which comes opposite or nearly opposite the grate, all as will now be more specifically explained.

According to the present method of illustrating my said invention in the drawings, A denotes the base or body of the stove, the lower section only of which is now shown; B, the grate; C, the ash-pit; D, the ledge on which the lower end of the fire-pot rests. In the wall or other part of the stove or heater, at any convenient or suitable point to allow access to the grate, are the opening or openings E, one or more, of any suitable shape, style, or construction, their use and purpose being merely to allow access through the wall or body of the stove to the grate or its upper surface, or to the space between the grate and fire-pot. To afford a suitable cover for said opening or openings I have provided a self-closing door, F. In the present instance I have shown the frame of the opening E constructed with walls that slope upwardly and outwardly, so that the said doors F, being hinged to the upper and inner edge of said frame, will close automatically after the means used for raising and opening it have been withdrawn; but I by no means limit myself to this special manner of carrying out the present invention, since it is obvious that this door or cover can be adjusted or applied in various ways to accomplish this end; for instance, the lower edge can be weighted, or the said door or cover may, in a construction of base somewhat the reverse of the present, be hung or applied to the outside. In these and various other equivalent ways I may accomplish the end now arrived at.

As thus made and constructed, when it is desired to gain access to the grate, or to the fire or coals upon the surface of the grate, or in the space between the fire-pot and grate, it is only necessary to thrust the poker, slicer, or shaker through the opening E in the body of the stove. This movement throws the cover or door F away from the said opening only sufficiently far to admit the easy play of the poker, slicer, or shaker in the operation upon the grate, fire, or coals; and when the said poker, slicer, or shaker is withdrawn the cover immediately falls down automatically into its proper position, and closes said opening.

In the method of construction now used for illustrating the above-described invention the lower edge of the door operates to scrape off all the dust or ashes from the poker, slicer, or shaker as it is being removed from the opening, after it has been used to stir or agitate the grate or the burning coals in the fire-pot and on the grate.

Having thus described my invention, what I consider new, and desire to secure by Letters Patent, is—

In combination with a stove or heater, having an aperture opposite or contiguous to the grate-surface, a self-closing door applied to said aperture in the manner described, so as to be opened by inserting a poker, and closed on withdrawal of same, substantially as and for the purposes set forth.

In testimony that I claim the foregoing I have hereunto set my hand this 11th day of November, 1875.

NATHANIEL A. BOYNTON.

Witnesses:

E. F. M. FAEHTZ,

GEORGE T. SMALLWOOD.